(12) United States Patent
Abratowski et al.

(10) Patent No.: US 8,712,327 B2
(45) Date of Patent: Apr. 29, 2014

(54) REMOTE DEVICE PAIRING SETUP

(75) Inventors: Przemyslaw Abratowski, Milton (CA); David Bukurak, Ottawa (CA)

(73) Assignee: BlackBerry Limited, Waterloo (CA)

( * ) Notice: Subject to any disclaimer, the term of this patent is extended or adjusted under 35 U.S.C. 154(b) by 83 days.

(21) Appl. No.: 12/916,857

(22) Filed: Nov. 1, 2010

(65) Prior Publication Data
US 2012/0015604 A1 Jan. 19, 2012

Related U.S. Application Data

(60) Provisional application No. 61/365,117, filed on Jul. 16, 2010.

(51) Int. Cl.
*H04B 7/00* (2006.01)

(52) U.S. Cl.
USPC .................................................. 455/41.2

(58) Field of Classification Search
USPC ................. 455/41.2, 41.3, 566, 90.1, 556.2; 715/763, 810, 835
See application file for complete search history.

(56) References Cited

U.S. PATENT DOCUMENTS

| | | | |
|---|---|---|---|
| 6,211,877 B1 * | 4/2001 | Steele et al. | 715/804 |
| 7,111,245 B2 * | 9/2006 | Brockway | 715/764 |
| 7,336,925 B2 * | 2/2008 | Zilliacus | 455/41.2 |
| 2005/0001902 A1 | 1/2005 | Brogan et al. | |
| 2005/0020316 A1 | 1/2005 | Mahini | |
| 2006/0212938 A1 | 9/2006 | Suzuki | |
| 2006/0229016 A1 | 10/2006 | Jang et al. | |
| 2007/0093207 A1 | 4/2007 | Kim | |
| 2007/0129013 A1 | 6/2007 | Mehta et al. | |
| 2009/0319673 A1 | 12/2009 | Peters | |

FOREIGN PATENT DOCUMENTS

GB  2360914 A  10/2001

OTHER PUBLICATIONS

Extended European Search Report mailed Feb. 28, 2011. In corresponding application No. 10189602.5.
Office Action mailed Mar. 25, 2013, in corresponding Canadian patent application No. 2,745,858.
English translation of the First Office Action mailed Jul. 30, 2013, in corresponding Chinese patent application No. 201110180077.8.
First Office Action mailed Jul. 30, 2013, in corresponding Chinese patent application No. 201110180077.8.

* cited by examiner

*Primary Examiner* — Eugene Yun
(74) *Attorney, Agent, or Firm* — Novak Druce Connolly Bove + Quigg LLP

(57) ABSTRACT

A communication device having a display and instructions for displaying a short range wireless function. The instructions can cause the display of a Toolkit homepage in response to a Toolkit application being selected in a homepage of the communication device. In response to the short range wireless function being selected in the Toolkit homepage, status of the short range wireless function on the communication device can be displayed. In response to the short range wireless function being turned on, a short range wireless function menu can be displayed. In response to a pairing option being selected from the displayed short range wireless function menu, menu options for pairing a short range wireless device with the communication device can be displayed.

20 Claims, 13 Drawing Sheets

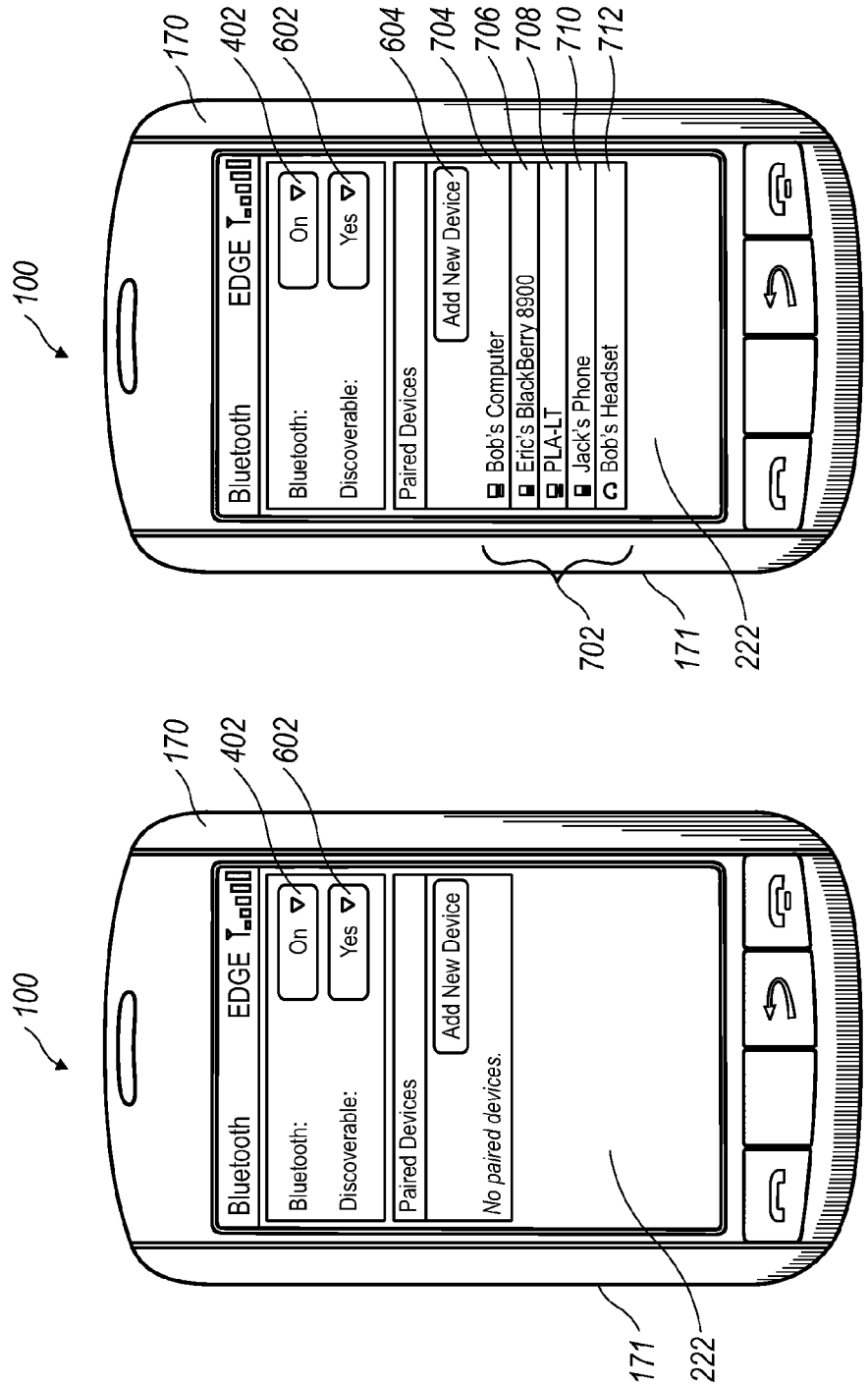

REMOTE DEVICE PAIRING SETUP

CROSS REFERENCE TO RELATED APPLICATIONS

This application claims priority to U.S. Provisional Application No. 61/365,117, filed on Jul. 16, 2010, said application is hereby incorporated by reference in its entirety.

FIELD OF TECHNOLOGY

The present disclosure relates generally to setting-up a short range wireless device. More specifically, the present disclosure relates to a method for pairing a short range wireless device with a communication device.

BACKGROUND

Communication devices are becoming more prevalent and more advanced. Mobile devices can include, but are not limited to, cellular telephones, smart telephones, wireless personal digital assistants (PDAs), and laptop computers with wireless 802.11 or Bluetooth capabilities. These devices can run on a wide variety of networks from data-only networks such as Mobitex® and DataTAC® networks to complex voice and data networks such as GSM/GPRS, CDMA, EDGE, UMTS and CDMA2000 networks. As the technology associated with mobile devices continues to advance, users of these communication devices are becoming more reliant on these communication devices. For example, technology advances are being made with respect to short range wireless devices. In one or more conventional operating systems, the short range wireless device can be a Bluetooth® function.

BRIEF DESCRIPTION OF THE DRAWINGS

Implementations of the present application will now be described, by way of example only, with reference to the attached Figures, wherein:

FIG. 6 is a communication device displaying a menu for setting up one or more short range wireless devices in accordance with an exemplary implementation;

FIG. 7 is a communication device displaying an alternative menu for setting up one or more short range wireless devices in accordance with an exemplary implementation;

DETAILED DESCRIPTION

Figure 1:
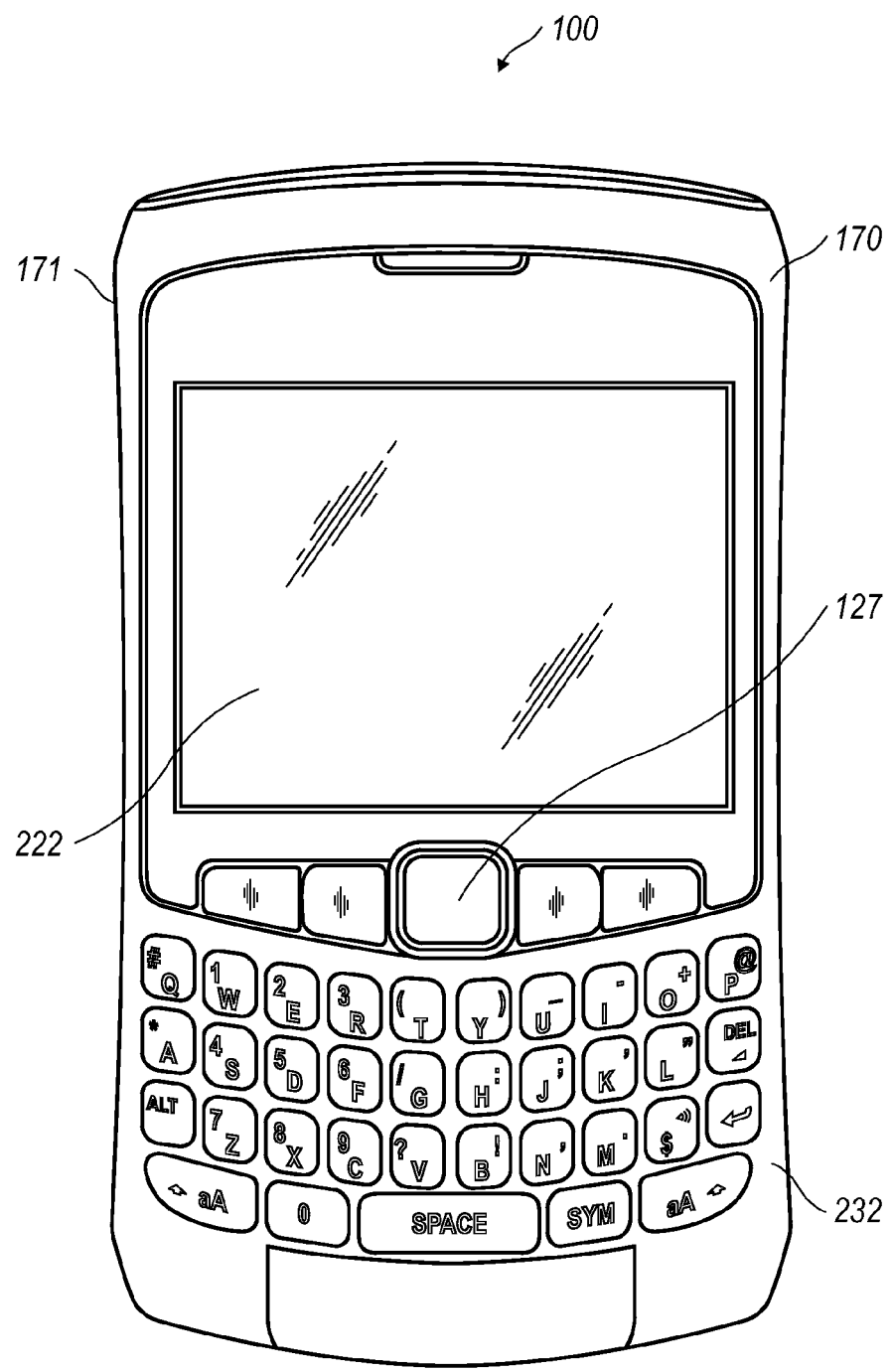
FIG. 1 is a front view of a communication device in accordance with an exemplary implementation.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

Referring to FIG. 1, a front view of an electronic communication device 100 in accordance with an exemplary implementation is illustrated. As shown, the communication device 100 can have a full QWERTY keyboard 232. Each key of the keyboard 232 can be associated with at least one indicia representing an alphabetic character, a numeral, or a command (such as a space command, return command, or the like). The plurality of the keys having alphabetic characters is arranged in a standard keyboard layout. This standard keyboard layout can be a QWERTY layout (shown in FIG. 1), a QZERTY layout, a QWERTZ layout, an AZERTY layout, a Dvorak layout, a Russian keyboard layout, a Chinese keyboard layout, or other similar layout, as well as reduced keyboard layouts. These standard layouts are provided by way of example and other similar standard layouts are considered within the scope of this disclosure. The keyboard layout can be based on the geographical region in which the device is intended for sale. In some examples, the keyboard can be interchangeable such that the user can switch between layouts. In other examples, the keyboard is a virtual keyboard provided on a touch screen display (not shown).

Figure 2:
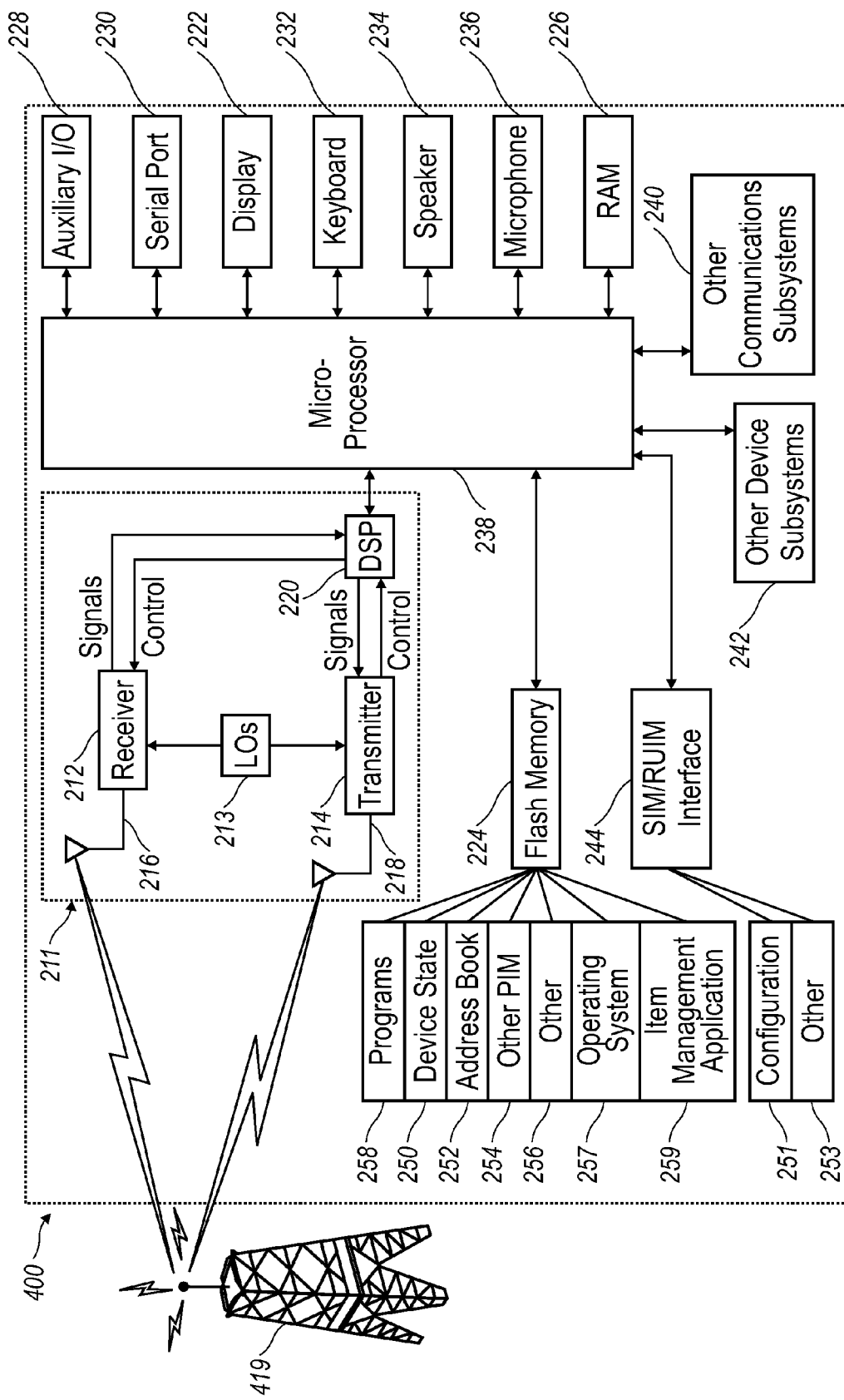
FIG. 2 is a block diagram representing a communication device interacting in a communication network in accordance with an exemplary implementation.

As shown, the exemplary communication devices 100 are communicatively coupled to a wireless network 219 as exemplified in the block diagram of FIG. 2. These figures are exemplary only, and those persons skilled in the art will appreciate that additional elements and modifications may be necessary to make the communication device 100 work in particular network environments. While in the illustrated implementations, the communication devices 100 are smart phones, however, in other implementations, the communication devices 100 may be personal digital assistants (PDA), laptop computers, desktop computers, servers, or other communication device capable of sending and receiving electronic messages.

Referring to FIG. 2, a block diagram of a communication device in accordance with an exemplary implementation is illustrated. As shown, the communication device 100 includes a microprocessor 238 that controls the operation of the communication device 100. A communication subsystem 211 performs all communication transmission and reception with the wireless network 219. The microprocessor 238 further can be communicatively coupled with an auxiliary input/output (I/O) subsystem 228 which can be communicatively coupled to the communication device 100. Additionally, in at least one implementation, the microprocessor 238 can be communicatively coupled to a serial port (for example, a Universal Serial Bus port) 230 which can allow for communication with other devices or systems via the serial port 230. A display 222 can be communicatively coupled to microprocessor 238 to allow for displaying of information to an operator of the communication device 100. When the communication device 100 is equipped with the keyboard 232, the keyboard can also be communicatively coupled with the microprocessor 238. The communication device 100 can include a speaker 234, a microphone, 236, random access memory (RAM) 226, and flash memory 224, all of which may be communicatively coupled to the microprocessor 238. The RAM 226 can be a non-transitory computer readable medium and can include processor executable instructions and data structures that implement aspect of the subject innovation. The flash memory 224 can be configured to hold processor readable instructions and data that implement aspects of the subject innovation. Other similar components may be provided on the communication device 100 as well and optionally communicatively coupled to the microprocessor 238. Other communication subsystems 240 and other communication device subsystems 242 are generally indicated as being functionally connected with the microprocessor 238 as well. An example of a communication subsystem 240 is that of a short range communication system such as Bluetooth® communication module or a WI-FI® communication module (a communication module in compliance with IEEE 802.11b) and associated circuits and components. Additionally, the microprocessor 238 is able to perform operating system functions and enables execution of programs on the communication device 100. In some implementations not all of the above components may be included in the communication device 100. For example, in at least one implementation the keyboard 232 is not provided as a separate component and is instead integrated with a touchscreen as described below.

The auxiliary I/O subsystem 228 can take the form of a variety of different navigation tools 127 (multi-directional or single-directional) such as an optical navigation module or tool as illustrated in the exemplary implementation shown in FIG. 1. In other implementations, a trackball, thumbwheel, a navigation pad, a joystick, touch-sensitive interface, or other I/O interface can be used. The navigation tool 127 can be located on a front surface 170 of the communication device 100 or may be located on any exterior surface of the communication device 100. Other auxiliary I/O subsystems can include external display devices and externally connected keyboards (not shown). While the above examples have been provided in relation to the auxiliary I/O subsystem 228, other subsystems capable of providing input or receiving output from the communication device 100 are considered within the scope of this disclosure. Additionally, other keys may be placed along the side of the communication device 100 to function as escape keys, volume control keys, scrolling keys, power switches, or user programmable keys, and may likewise be programmed accordingly.

As may be appreciated from FIG. 1, the communication device 100 comprises the lighted display 222 located above the keyboard 232 constituting a user input and suitable for accommodating textual input to the communication device 100. The front face 170 of the communication device 100 has a navigation row 70. As shown, the communication device 100 is of unibody construction, also known as a "candy-bar" design. In alternate implementations, the communication device 100 can be a "clamshell" or a "slider" design.

As described above, the communication device 100 may include the auxiliary input 228 that acts as a cursor navigation tool 127 and which can be also exteriorly located upon the front face 170 of the communication device 100. Its front face location allows the tool to be easily thumb-actuable like the keys of the keyboard 232. An implementation provides the navigation tool 127 in the form of a navigation module having an optical sensor or laser sensor, a capacitive sensor, or both, which can be utilized to instruct two-dimensional or three-dimensional screen cursor movement in substantially any direction, as well as act as an actuator when the optical navigation module is depressed like a button. Other navigation tools 127 can be used, for example, a trackball. The placement of the navigation tool 127 may be above the keyboard 232 and below the display screen 222; here, the navigation tool 127 can avoid interference during keyboarding and does not block the operator's view of the display screen 222 during use.

As illustrated in FIG. 1, the communication device 100 may be configured to send and receive messages. The communication device 100 includes a body 171 which may, in some implementations, be configured to be held in one hand by an operator of the communication device 100 during text entry. The display 222 is included which is located on the front face 170 of the body 171 and upon which information is displayed to the operator during text entry. The communication device 100 may also be configured to send and receive voice communications such as mobile telephone calls. The communication device 100 may also include a camera (not shown) to allow the user to take electronic photographs which can be referred to as photos or pictures.

Furthermore, the communication device 100 is equipped with components to enable operation of various programs, as shown in FIG. 2. In an exemplary implementation, the flash memory 224 is enabled to provide a storage location for the operating system 257, device programs 258, and data. The operating system 257 is generally configured to manage other programs 258 that are also stored in memory 224 and executable on the microprocessor 238. The operating system 257 honors requests for services made by programs 258 through predefined program 258 interfaces. More specifically, the operating system 257 typically determines the order in which multiple programs 258 are executed on the microprocessor 238 and the execution time allotted for each program 258, manages the sharing of memory 224 among multiple programs 258, handles input and output to and from other device subsystems 242, and so on. In addition, operators can typically interact directly with the operating system 257 through a user interface usually including the keyboard 232 and display screen 222. While in an exemplary implementation the operating system 257 is stored in flash memory 224, the operating system 257 in other implementations is stored in read-only memory (ROM) or similar storage element (not shown). As those skilled in the art will appreciate, the operating system 257, device program 258 or parts thereof may be loaded in RAM 226 or other volatile memory.

When the communication device 100 is enabled for two-way communication within the wireless communication network 219, the communication device 100 can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 may require a unique identifier to enable the communication device 100 to transmit and receive signals from the communication network 219. Other systems may not require such identifying information. GPRS, UMTS, and EDGE use a smart card such as a Subscriber Identity Module (SIM) in order to allow communication with the communication network 219. Likewise, most CDMA systems use a Removable Identity Module (RUIM) in order to communicate with the CDMA network. A smart card can be used in multiple different communication devices 100. The communication device 100 may be able to operate some functions without a smart card, but the communication device 100 will not be able to communicate with the network 219. A smart card interface 244 located within the communication device 100 allows for removal or insertion of a smart card (not shown). The smart card functions memory and holds key configurations 251, and other information 253 such as identification and subscriber related information. With a properly enabled communication device 100, two-way communication between the communication device 100 and communication network 219 is possible.

If the communication device 100 is enabled as described above or the communication network 219 does not require such enablement, the two-way communication enabled communication device 100 is able to both transmit and receive information from the communication network 219. The transfer of communication can be from the communication device 100 or to the communication device 100. In order to communicate with the communication network 219, the communication device 100 in the presently described exemplary implementation is equipped with an integral or internal antenna 218 for transmitting signals to the communication network 219. Likewise the communication device 100 in the presently described exemplary implementation is equipped with another antenna 216 for receiving communication from the communication network 219. These antennae (216, 218) in another exemplary implementation are combined into a single antenna (not shown). As one skilled in the art would appreciate, the antenna or antennae (216, 218) in another implementation are externally mounted on the communication device 100.

When equipped for two-way communication, the communication device 100 functions the communication subsystem 211. As is understood in the art, this communication subsystem 211 is modified so that the communication subsystem 211 can support the operational needs of the communication device 100. The subsystem 211 includes a transmitter 214 and receiver 212 including the associated antenna or antennae (216, 218) as described above, local oscillators (LOs) 213, and a processing module 220, which in the presently described exemplary implementation is a digital signal processor (DSP) 220.

It is contemplated that communication by the communication device 100 with the wireless network 219 can be any type of communication that both the wireless network 219 and communication device 100 are enabled to transmit, receive and process. In general, these can be classified as voice and data. Voice communication generally refers to communication in which signals for audible sounds are transmitted by the communication device 100 through the communication network 219. Data generally refers to all other types of communication that the communication device 100 is capable of performing within the constraints of the wireless network 219.

The keyboard 232 can include a plurality of keys that can be of a physical nature such as actuable buttons, or they can be of a software nature, typically constituted by virtual representations of physical keys on the display screen 222 (referred to herein as "virtual keys"). The user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 222, which in one implementation is enabled by touching the display screen 222, for example, with a stylus, finger, or other pointer, to generate the character or activate the indicated command or function. Some examples of display screens 222 capable of detecting a touch include resistive, capacitive, projected capacitive, infrared and surface acoustic wave (SAW) touchscreens.

Physical and virtual keys can be combined in many different ways as appreciated by those skilled in the art. In one implementation, physical and virtual keys are combined such that the plurality of enabled keys for a particular program or function of the communication device 100 is shown on the display screen 222 in the same configuration as the physical keys. Using this configuration, the operator can select the appropriate physical key corresponding to what is shown on the display screen 222. Thus, the desired character, command or function is obtained by depressing the physical key corresponding to the character, command or function displayed at a corresponding position on the display screen 222, rather than touching the display screen 222.

While the above description generally describes the systems and components associated with a communication device, the communication device 100 could be another communication device such as a PDA, a laptop computer, desktop computer, a server, or other communication device. In those implementations, different components of the above system might be omitted in order to provide the desired communication device 100. Additionally, other components not described above may be required to allow the communication device 100 to function in a desired fashion. The above description provides only general components and additional components may be required to enable the system to function. These systems and components would be appreciated by those of ordinary skill in the art. Further, this description references Bluetooth® technology as an example of open wireless technology for exchanging data over short distances. However, this description is not limited to Bluetooth® technology but is broader and includes other short range wireless technology.

Figure 3:
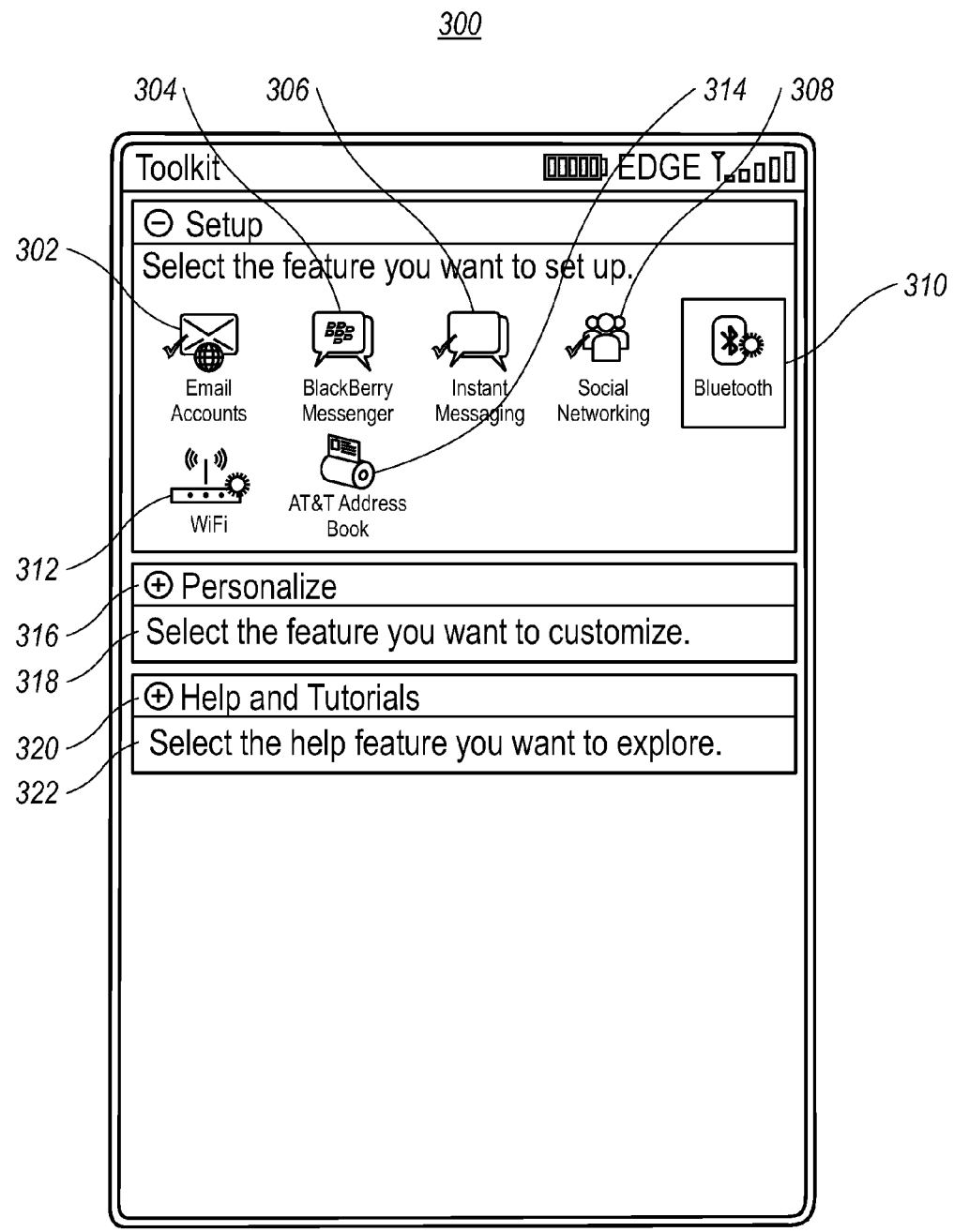
FIG. 3 is a screenshot of a Toolkit function menu for a communication device in accordance with an exemplary implementation.

Referring to FIG. 3, a screenshot of a Toolkit function menu for a communication device 100 in accordance with an exemplary implementation is illustrated. As shown, the screenshot 300 can be for the homepage of a Toolkit function, e.g., a setup screen, for setting up one or more applications.

Figure 16:
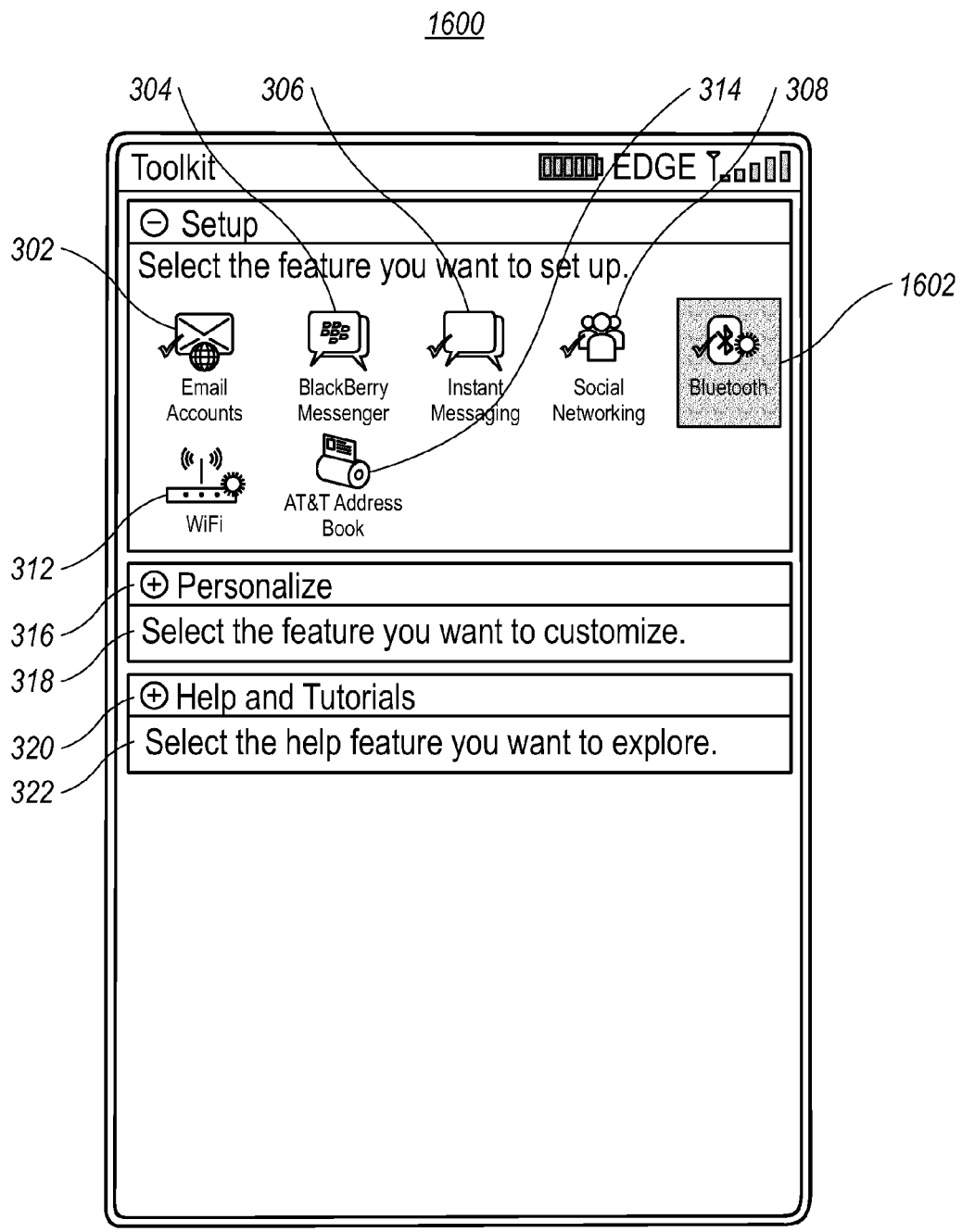
FIG. 16 is a screenshot of the Toolkit function menu providing an indication that there is a paired device in accordance with an exemplary implementation.

For example, the applications can be for Email Accounts 302, BlackBerry Messenger 304, Instant Messaging 306, Social Networking 308, Bluetooth® 310, WiFi 312, and AT&T Address Book 314. As shown, the Bluetooth® 310 icon is highlighted. In addition, the screenshot 300 includes icons for Personalization 316 with associated instructions 318 and for Help and Tutorials 320 with associated instructions 320. In this screenshot 300, the Bluetooth® icon 310 is displayed without a checkmark providing an indication that the communication device 100 is not paired with another short range wireless device. If the communication device was paired with one or more short range wireless devices, then the Bluetooth® icon 312 would include a checkmark as shown in FIG. 16. In one or more embodiments, accessing the short range wireless function, for example, the Bluetooth® 310 function can only be accessed through the Toolkit function.

Figure 4:
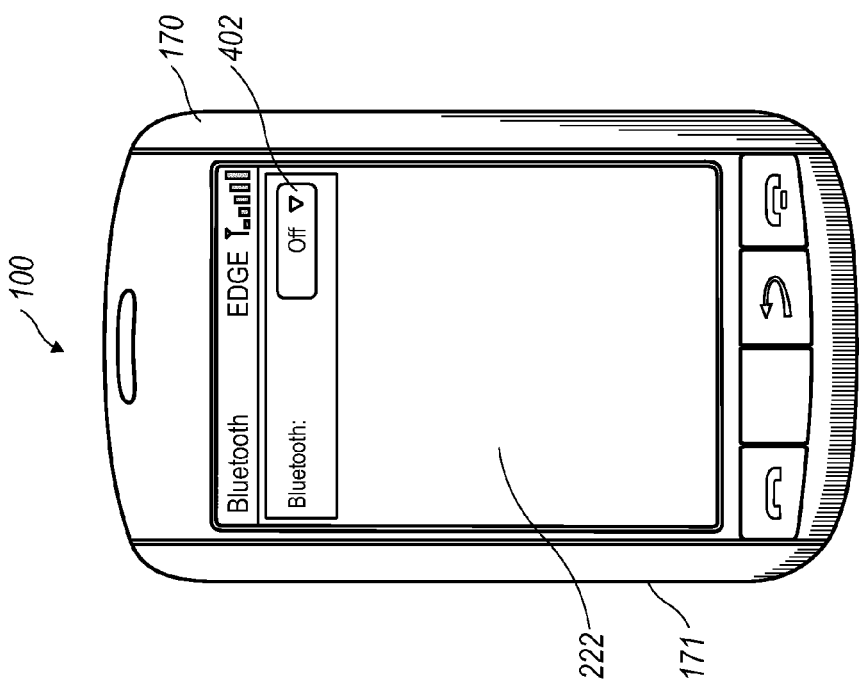
FIG. 4 is a communication device displaying the status of the short range wireless function in accordance with an exemplary implementation.

Referring to FIG. 4, a communication device 100 displaying the status of the short range wireless function in accordance with an exemplary implementation is illustrated. The communication device 100 displays the status of the short range wireless function in response to the Bluetooth® icon 310 being selected. As shown, the Bluetooth® function is Off. In one or more conventional operating systems for communication devices, by clicking on the Bluetooth® icon 310, the Bluetooth® function would be activated, for example, turned on. Such activation can cause problems, such as a user not wanting to activate the Bluetooth® function because the user is concerned about security of the electronic device. As shown, the communication device 100 can display the status of the Bluetooth® function and a dropdown menu 402 for activating the Bluetooth® function. As shown in FIG. 4, there are no short range wireless devices paired with the communication device 100.

Figure 5:
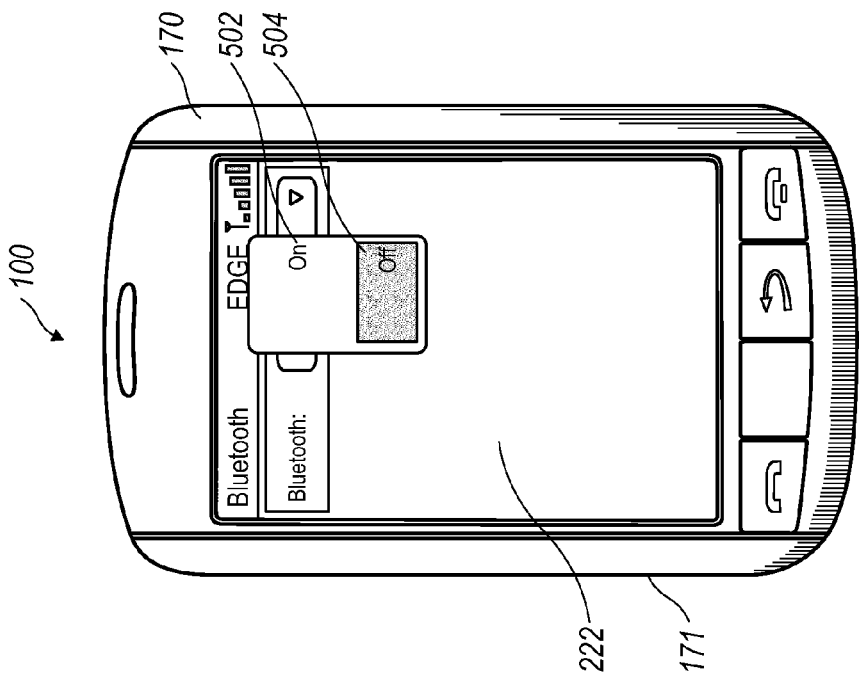
FIG. 5 is a communication device displaying a menu for activating the short range wireless function of the communication device in accordance with an exemplary implementation.

Referring to FIG. 5, a communication device 100 displaying a menu for activating the short range wireless function, e.g., Bluetooth® function, of the communication device in accordance with an exemplary implementation is illustrated. The communication device 100 can display the menu for activating the short range wireless function in response to the dropdown menu 402 of FIG. 4 being selected. The user can use the menu for activating the short range wireless function to turn on the short range wireless function. For example, by placing a cursor (not shown) on the menu 402 and selecting an "ON" option 502 or if the menu items are linked, the user can use the navigation tool 127 to highlight and select the "ON" option 502. Similarly, if one or more short range wireless devices are activated, the user can use the menu to turn the short range wireless function off. For example, by placing a cursor (not shown) on and selecting an "OFF" option 504 or if the menu items are linked, the user can use the navigation tool 127 to highlight and select the "OFF" option 504.

Referring to FIG. 6, a communication device 100 displaying a menu for setting up one or more short range wireless devices in accordance with an exemplary implementation is illustrated. The communication device 100 can display the menu in response to the dropdown menu 402 of FIG. 4 being selected when there are no paired short range wireless devices. As shown, the display can include a Discoverable dropdown menu 602 and an Add New Device menu 604. The Discoverable dropdown menu 602 allows the communication device 100 to be discovered by other short range wireless devices that are capable of detecting a pairing signal. The Add New Device menu 604 allows a user to pair the communication device 100 with another short range wireless device.

Referring to FIG. 7, a communication device 100 displaying an alternative menu for setting up one or more short range wireless devices in accordance with an exemplary implementation is illustrated. The communication device 100 can display the menu in response to the dropdown menu 402 of FIG. 4 being selected when there are paired short range wireless devices. As shown, the display can include a Discoverable dropdown menu 602 and an Add New Device menu option 604. The listing of paired short range wireless devices 702 includes icons for Bob's Computer 704 (for example, a previously paired computer such as a computer including the BlackBerry® Enterprise Solution), Eric's BlackBerry 8900 706, PLA-LT 708 (a name of a laptop), Jack's Phone 710, and Bob's Headset 712.

Figure 8:
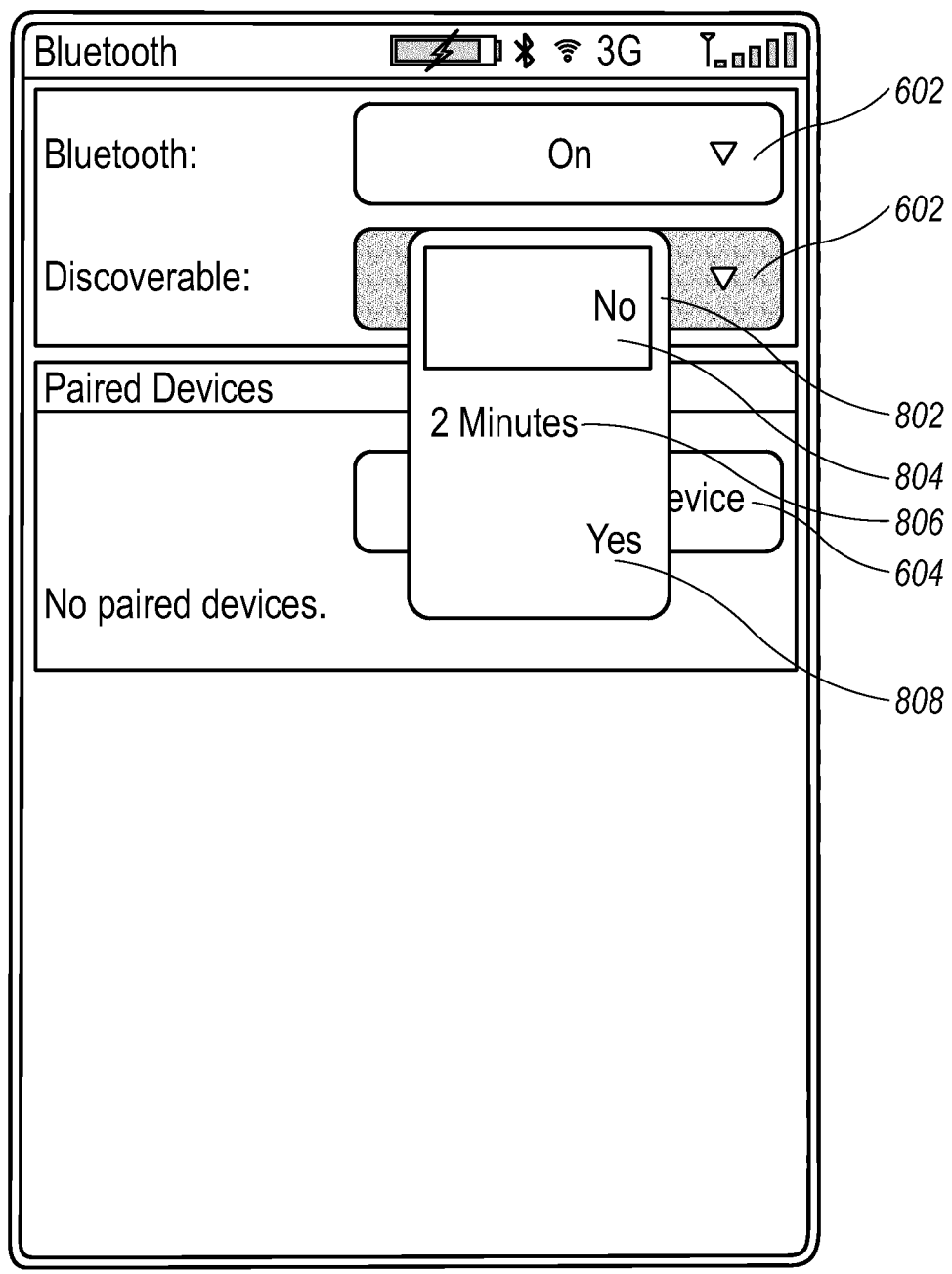
FIG. 8 is a screenshot of the Discoverable menu in accordance with an exemplary implementation.

Referring to FIG. 8, a screenshot 800 of the Discoverable menu in accordance with an exemplary implementation is illustrated. This screenshot 800 can be displayed in response to the Discoverable dropdown menu 602 of FIG. 6 or FIG. 7 being selected. As shown, the Discoverable menu 802 can include a No option 804, a 2 Minutes option 806, and a Yes option 808. The No option 802 can be highlighted. The Discoverable function allows the communication device 100 to be found by another short range wireless device, but does not require the two devices to be connected. For example, the two devices may not be compatible or the users of the two short range wireless devices may not want to connect. The No option 802 can prevent the communication device 100 from being discovered by other short range wireless devices. The 2 Minutes option 806 can allow the communication device 100 to be discovered by other short range wireless devices for two minutes. In one or more implementations, the user can adjust the amount of time the communication device 100 can discover other short range wireless devices. The predetermined time limit, for example, two minutes, is a security measure. Alternatively, the user can select the Yes option 808 if the user does not want to limit the time or can manually end the discover function by selecting the No option 804.

Figures 9, 10:
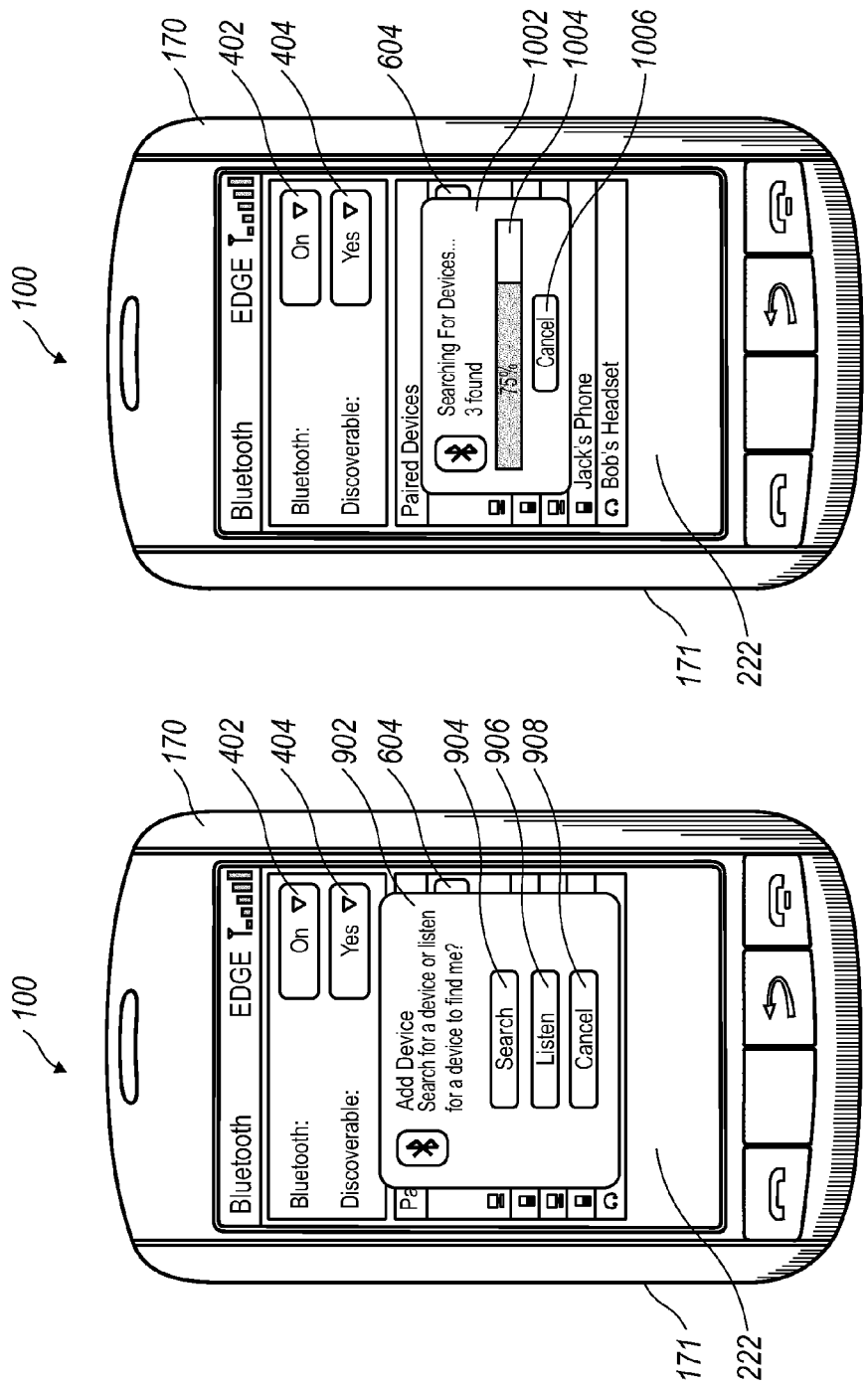
FIG. 9 is a communication device displaying an Add Device menu in accordance with an exemplary implementation.
FIG. 10 is a communication device displays a search status window in accordance with an exemplary implementation.

Referring to FIG. 9, a communication device 100 displaying an Add Device menu 902 in accordance with an exemplary implementation is illustrated. The communication device 100 can display the Add Device menu 902 in response in response to the Add New Device menu option 604 in FIG. 7 being selected. As shown, an Add Device menu 902 can include the options of Search 904, Listen 906, and Cancel 908. The Search option 904 can allow the communication device 100 to search for other short range wireless devices. The Listen option 906 can allow the communication device 100 to be found by other short range wireless devices. The Cancel option 908 can cancel the Add New Device function.

Referring to FIG. 10, a communication device 100 displays a search status window 1002 in accordance with an exemplary implementation is illustrated. The communication device 100 can display the search status window 1002 in response to the Search option 904 being selected in FIG. 9. As shown, the search status window 1002 can show the status of the search along with a percentage bar 1004 and a Cancel option 908. The percentage bar 1004 can provide an indication of the search status, for example 75% complete. The percentage bar 1004 can indicate various levels of completion. The percentage bar 1004 allows for quick identification of the level and the specific numerical amount provides a precise level. Additionally, the percentage bar 1004 can be embodied in other representations, such as a rotating circle having a percentage filled and the like. The status window 1002 can provide an indication of the number of short range wireless devices that have been discovered during the search, for example three devices. The Cancel option 908 can cancel the Add New Device function.

Figures 11, 12:
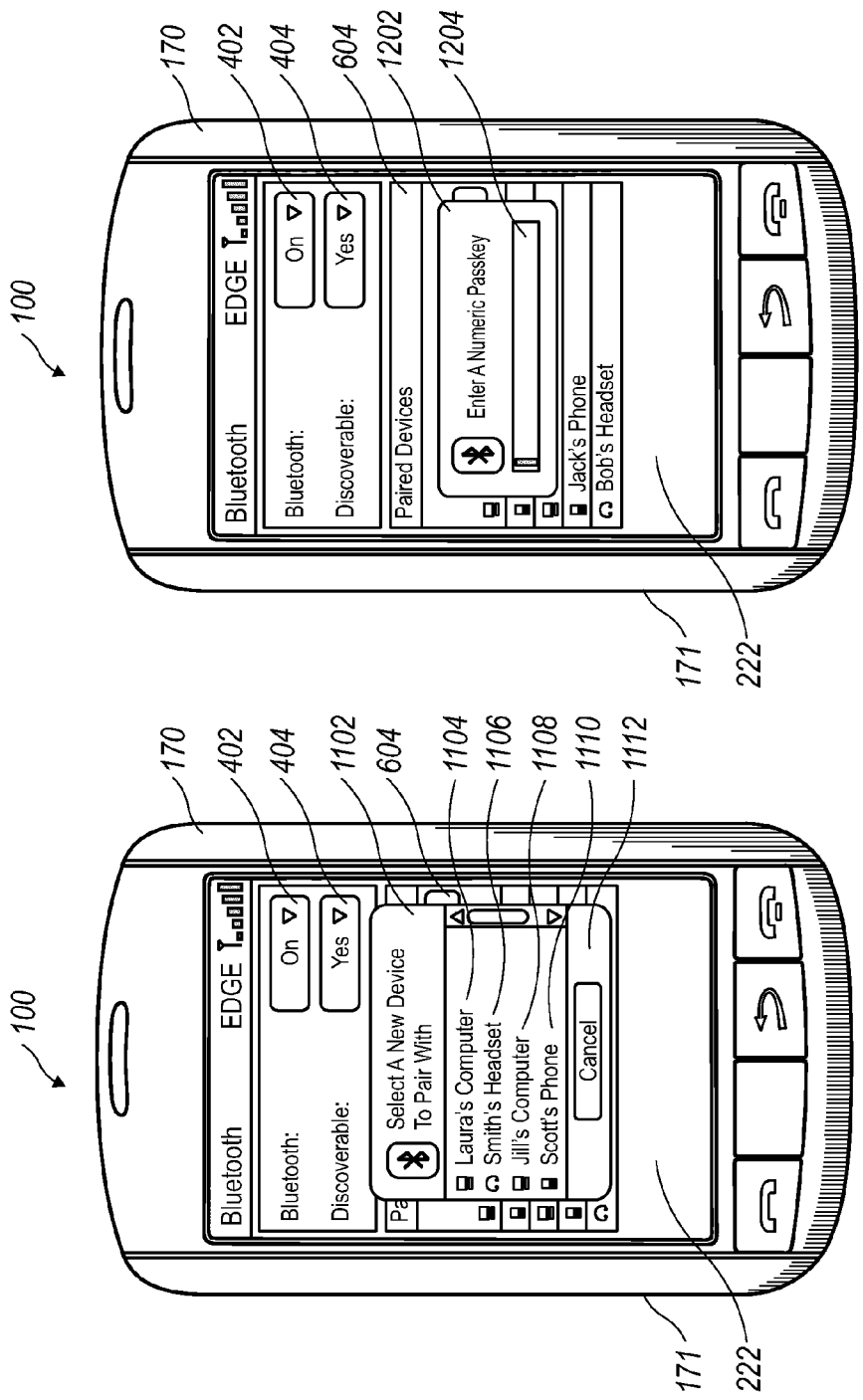
FIG. 11 is a communication device displays a search result window in accordance with an exemplary implementation.
FIG. 12 is a communication device displays a prompt for a passcode in accordance with an exemplary implementation.

Referring to FIG. 11, a communication device 100 displays a search result window 1102 in accordance with an exemplary implementation is illustrated. The communication device 100 can display the search result window 1102 in response to a search being completed. As shown, the search result window 1102 can display a list of the short range wireless devices that have been found during the search along with a Cancel option 908. The list of found devices includes Laura's Computer 1104, Smith's Headset 1106, Jill's Computer 1108, and Scott's Phone 1110. The Cancel option 908 can cancel the Add New Device function.

Referring to FIG. 12, a communication device 100 displays a prompt for a passcode in accordance with an exemplary implementation is illustrated. The communication device 100 can display the prompt 1204 in response to a device being selected (not shown) from the list of found devices from the result window 1102 of FIG. 11. As shown, the user can be prompted to "Enter A Numeric Passkey" 1202. The numeric passkey can be a passcode or password that is associated with a found device. The user can enter the numeric passkey in a prompt 1204. For example, a user can use a physical keyboard or a touchscreen keyboard to enter the numeric passkey in the Enter A Temporary Numeric Passkey prompt 1204.

Figures 13, 14:
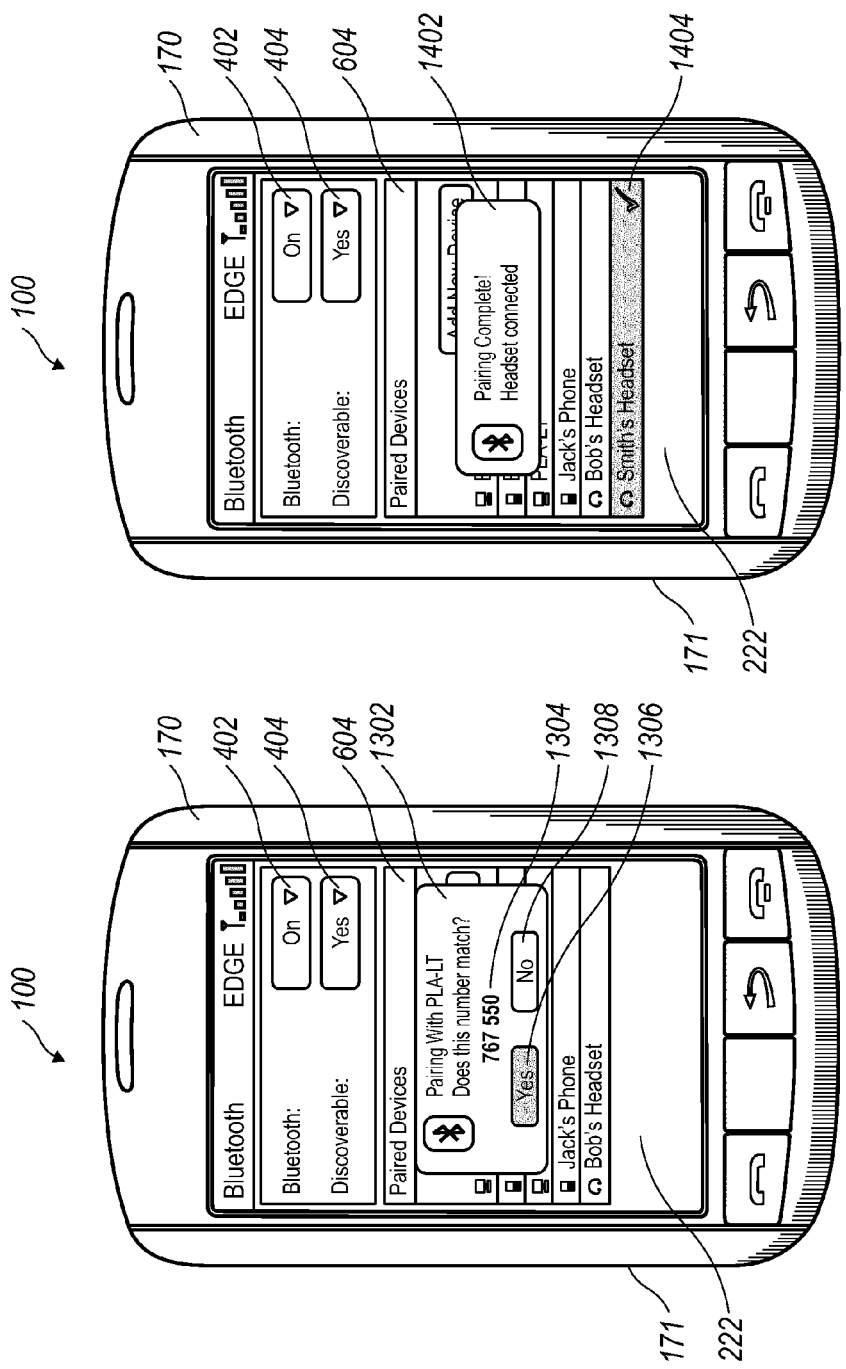
FIG. 13 is a communication device displays a confirmation window in accordance with an exemplary implementation.
FIG. 14 is a communication device displaying a completion window in accordance with an exemplary implementation.

Referring to FIG. 13, a communication device 100 displays a confirmation window 1302 in accordance with an exemplary implementation is illustrated. The communication device 100 can display the confirmation window 1302 prompting the user to confirm the accuracy of the temporary numeric passkey being entered in the Enter A Numeric Passkey prompt 1204 of FIG. 12. As shown, the confirmation window 1302 can display the entered passkey 1304 (for example, 767 550) with a Yes option 1306 or a No option 1308. If the entered passkey 1304 is accurate the user can select the Yes option 1306 and if the entered passkey 1304 is not accurate the user can select the No option 1308. If the user enters the No option 1208, the prompt for entering a passcode 1204 of FIG. 12 can be displayed.

Referring to FIG. 14, a communication device 100 displaying a completion window 1402 in accordance with an exemplary implementation is illustrated. The communication device 100 can display the completion window 1402 in response to the pairing being complete. The completion window 1402 can include a message informing the user that the pairing was successful is displayed, for example, "Pairing Complete! Headset connected." In addition, the new pairing can be displayed in the list of paired devices, for example, Smith's Headset 1404 is displayed in the list. The newest pairing 1404 can be highlighted to provide an indication of the new pairing. The newest pairing can include a checkmark showing that the device was added.

Figure 15:
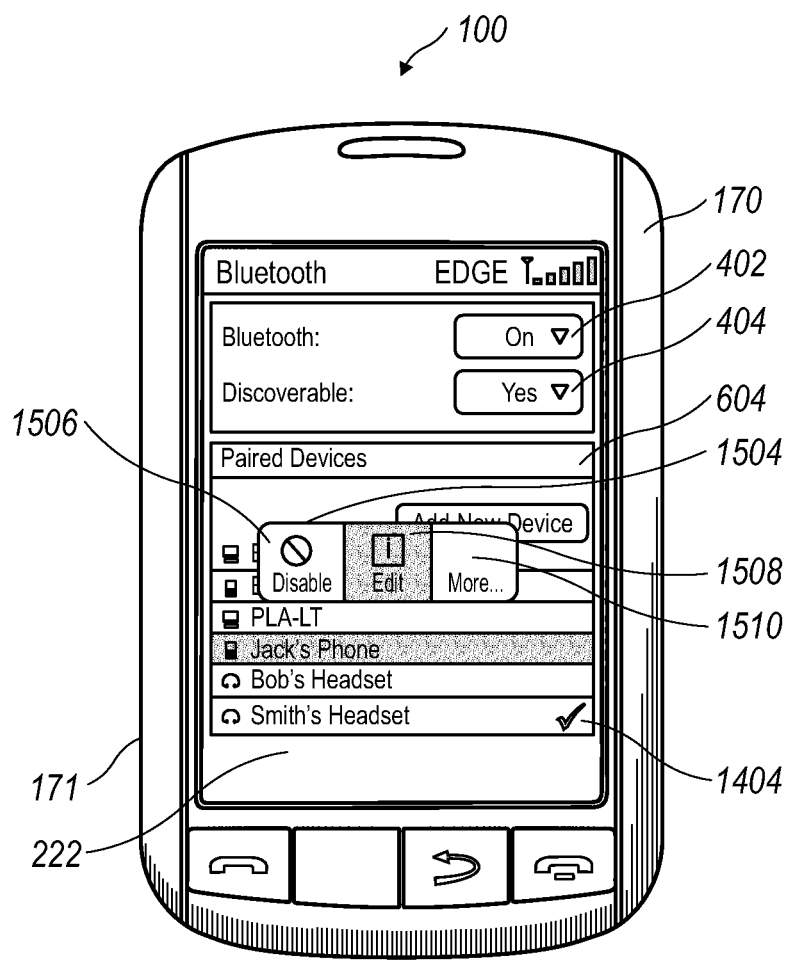
FIG. 15 is a communication device displaying a short menu in accordance with an exemplary implementation.

Referring to FIG. 15, a communication device 100 displaying a short menu 1504 in accordance with an exemplary implementation is illustrated. The communication device 100 can display the short menu 1504 in response to a paired device being selected from the list of paired devices. As shown, Jack's Phone 1502 is the selected paired device. The short menu 1504 or graphical short context menu can include a disable option 1506, an edit option 1508, and a more option 1510. The disable option 1506, when selected, can cause the paired device to be inactive. The edit option 1508, when selected, can allow the user to rename the paired device. The more option 1510, when selected, can cause a menu listing additional menu options associated with the paring to be displayed.

Referring to FIG. 16, a screenshot 1600 of the Toolkit function menu providing an indication that there is a paired device in accordance with an exemplary implementation is illustrated. This screenshot 1600 can be displayed when the Toolkit function is accessed and there is a paired short range wireless device or after a short range wireless device was just paired with the communication device. As shown, the screenshot 1600 provides an indication that a short range wireless device is paired with the communication device 100 by displaying a checkmark on the Bluetooth® icon 1602. In one or more implementations, other indicators can be used to indicate that a short range wireless device is paired with the communication device, for example, the indicator can include coloring the icon, changing the background color of the icon, graying an indicative icon, and the like.

Figure 17A:
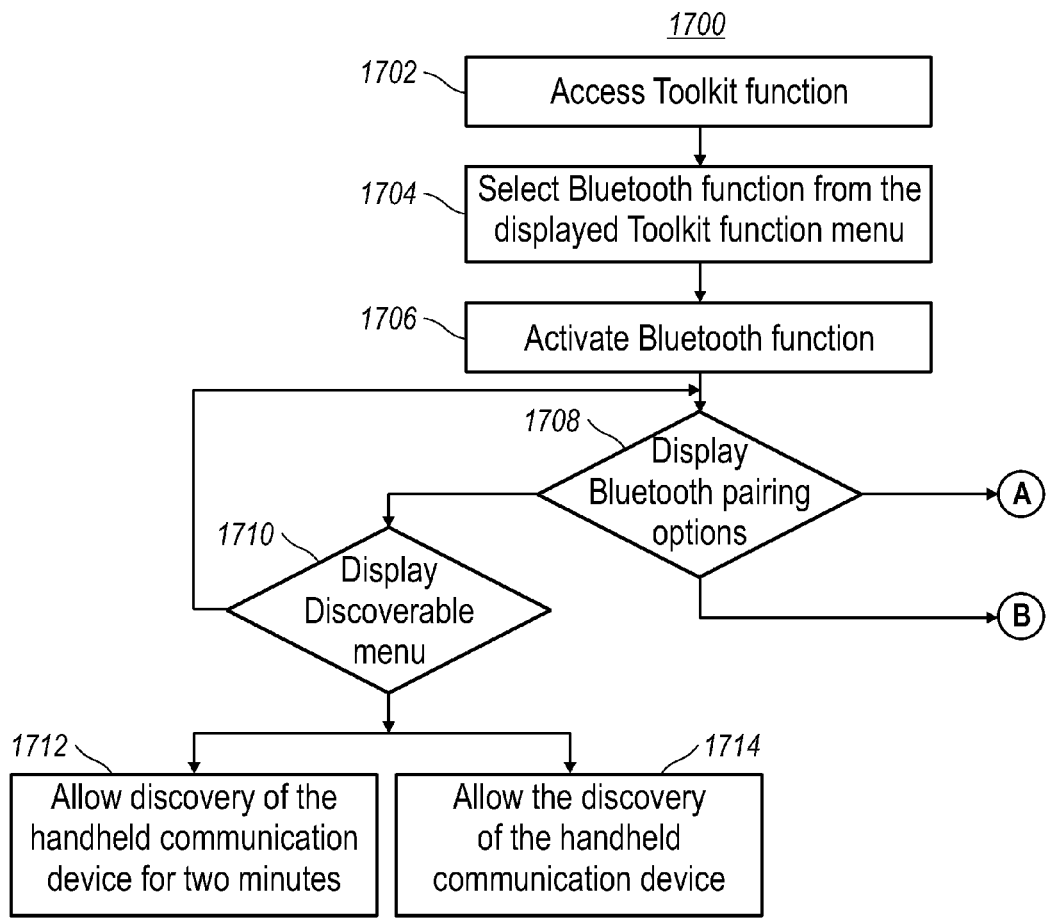
FIGS. 17A and 17B is a flowchart of a method for pairing a short range wireless device with a communication device in accordance with an exemplary implementation.
Figure 17B:
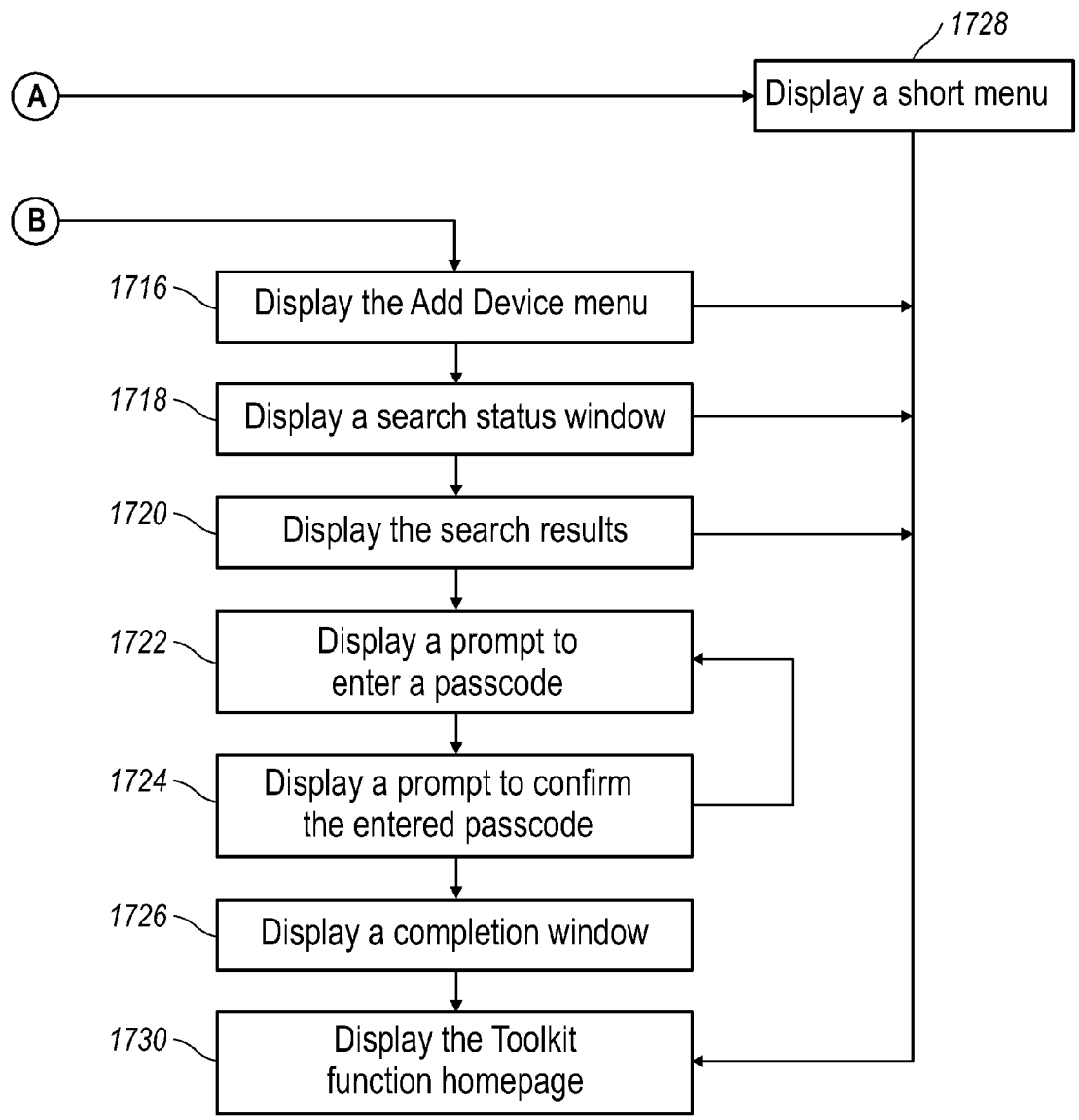

Referring to FIG. 17, a flowchart of a method 1700 for pairing a short range wireless device with a communication device in accordance with an exemplary implementation is illustrated. The exemplary method 1700 is provided by way of example, as there are a variety of ways to carry out the method. In one or more implementations, the method 1700 can be performed by the microprocessor 238 of the communication device 100. The method 1700 can be executed or otherwise performed by one or a combination of various systems. The method 1700 described below can be carried out using the communication devices and communication network shown in FIGS. 1 and 2 by way of example, and various elements of these figures are referenced in explaining exemplary method 1700. Each block shown in FIG. 17 represents one or more processes, methods or subroutines carried out in exemplary method 900. The exemplary method 1700 may begin at block 1702.

At block 1702, a Toolkit application can be accessed. For example, a user can select the Toolkit application displayed on the homepage of the communication device 100. In response to the Toolkit application being selected, the microprocessor 238 can cause a Toolkit application menu to be displayed on the display 222 of the communication device as shown in FIG. 3. The Toolkit application is the only means on the communication device 100 to access the short range wireless function. Once accessed, the user can perform several functions, including, but not limited to, activating the short range wireless function, pairing a short range wireless device with the communication device 100, or both. After accessing the Toolkit application, the method 1700 can proceed to block 1704.

At block 1704, the short range wireless function can be selected from the displayed Toolkit application menu. For example, a user can select the Bluetooth® function from the Toolkit application menu displayed on the communication device 100. In response to the short range wireless function being selected, the microprocessor 238 can cause the status of the short range wireless function to be displayed on the display 222 of the communication device as shown in FIG. 4. After the short range wireless function is selected, the method 1700 can proceed to block 1706.

At block 1706, the short range wireless function can be activated. For example, using a navigation tool 127 a user can select the menu 402 as shown in FIG. 4. In response to the menu 402 being selected, the microprocessor 238 can cause the display of a menu with an On option 502 and an Off option 504 on the display 222 of the communication device as shown in FIG. 5. In response to the user selecting the On option 502, the microprocessor 238 can activate the Bluetooth® function. In order to activate the Bluetooth® function, the user must make a selection. In other words, by accessing the Bluetooth® function, the Bluetooth® function is not automatically activated. This is a security measure to ensure that the user desires to have the Bluetooth® function active. For example, if the user is concerned about security such as improper access to the communication device 100 or messages associated with the communication device 100, the user does not have to turn off the Bluetooth® function once the Bluetooth® function was selected from the Toolkit application. In response to the user selecting the Off option 504, the microprocessor 238 can de-activate the Bluetooth® function. After the Bluetooth® function is activated, the method 1700 can proceed to block 1708.

At block 1708, the Bluetooth® pairing options can be displayed. For example, in response to the Bluetooth® function being activated, the microprocessor 238 can cause the display of a pairing menu on the display 222 of the communication device as shown in FIG. 6. The pairing menu can include a Discoverable option 602 and Add New Device option 604. Using a navigation tool 127 a user can select an option. In the event the user selects the Discoverable option 602, the method 1700 can proceed to block 1710 and in the event the user selects the Add New Device option 604, the method 1700 can proceed to block 1716.

At block 1710, the Discoverable menu can be displayed. For example, in response to the Discoverable option 602 being selected, the microprocessor 238 can cause the display of the Discoverable menu 802 as shown in FIG. 8. The Discoverable menu 802 can include a No option 804, 2 Minutes option 806, and a Yes option 808. In the event the user selects the No option 804, the method 1700 can proceed to block 1708. In the event the user selects the 2 Minutes option 806, the method 1700 can proceed to block 1712. In the event the user selects the Yes option 808, the method 1700 can proceed to block 1714.

At block 1712, the communication device can be discovered for two minutes. For example, in response to the 2 Minutes option 806 being selected, the microprocessor 238 can allow the communication device 100 to be found by another short range wireless device, but does not require the two devices to be connected. For example, the two devices may not be compatible or the users of the two short range wireless devices may not want to connect. In one or more implementations, the communication device 100 can be discovered for a predetermined time that can be adjusted by the user. After the predetermined time elapses, e.g., two minutes, the microprocessor 238 can terminate the discover feature and the method 1700 can proceed to block 1730.

At block 1714, the communication device can activate the discover feature. For example, in response to the Yes option 808 being selected, the microprocessor 238 can allow the communication device 100 to be found by another short range wireless device, but does not require the two devices to be connected. The discover feature can remain on until the user deactivates the feature, e.g., selecting the No option 804 from the Discoverable menu 802. After activating the discover feature, the method 1700 can proceed to block 1730.

At block 1716, the Add Device menu can be displayed. For example, in response to the Add New Device Option 604 being selected, the microprocessor 238 can cause the display of the Add Device menu 902 on the display 222 of the communication device 100 as shown in FIG. 9. The Add Device menu 902 can include the options of Search 904, Listen 906, and Cancel 908. In the event the Cancel option 908 is selected, the method 1700 can proceed to block 1730. In response to the Listen Option 906 being selected, the microprocessor 238 can allow the communication device 100 to be found by other devices. In response to the Search option 904 being selected, the method 1700 can proceed to block 1718.

At block 1718, a search status window can be displayed. For example, in response to the Search option 904 being selected, the microprocessor 238 can initiate a search for short range wireless devices within a range of the communication device 100 and can cause the display of the search status window 1002 as shown in FIG. 10. The search status window 1002 can include a percentage bar 1004 and a Cancel option 908. The percentage bar 1004 can provide an indication of the search status, for example, 75% complete. The search status window 1002 can provide an indication of the number of short range wireless devices that have been discovered during the search, for example, three devices. In the event the Cancel option 908 is selected, the microprocessor can terminate the search and the method 1700 can proceed to block 1730. Upon completion of the search, the method 1700 can proceed to block 1720.

At block 1720, the search results can be displayed. For example, in response to the search being completed, the microprocessor 238 can display a search results window 1102 as shown in FIG. 11. The search results window 1102 can list the devices that have been found during the search and can include a Cancel option 1112. In the event the Cancel option 1112 is selected, the method 1700 can proceed to block 1730. In the event a found device is selected from the list, the method 1700 can proceed to block 1722.

At block 1722, a prompt to enter a passcode is displayed. For example, in response to a found device being selected, the microprocessor 238 can display a prompt asking the user to "Enter A Numeric Passkey" 1202 as shown in FIG. 12. The numeric passkey can be a passcode or password that is associated with a found device. The user can enter the numeric passkey in the prompt 1204. For example, a user can use a physical keyboard or a touchscreen keyboard to enter a numeric passkey in the Enter A Numeric Passkey prompt 1202. After the user enters the passcode, the method 1700 can proceed to block 1724.

At block 1724, a prompt to confirm the entered passcode is displayed. For example, in response to the user entering the passcode, the microprocessor 238 can display a prompt 1302 to confirm the entered passcode 1304 as shown in FIG. 13. As shown in FIG. 13, a confirmation window 1302 is displayed identifying the entered passkey 1304 with a Yes option 1306 or a No option 1308. If the entered passkey 1304 is accurate the user can select the Yes option 1306 and if the entered passkey 1304 is not accurate the user can select the No option 1308. In the event the user selects the Yes option 1308, the method 1700 can proceed to block 1726. In the event the user selects the No option 1308, the method can proceed to block 1722.

At block 1726, a completion window is displayed. For example, in response to the user selecting the Yes option 1208, the microprocessor 238 can display the completion window 1402 as shown in FIG. 14. The completion window 1402 can include a message informing the user that the pairing was successful, for example, "Pairing Complete! Headset connected." In addition, the new pairing can be displayed in the list of paired devices, e.g., Smith's Headset 1404 is displayed in the list. The newest pairing 1404 can be highlighted to provide an indication of the new pairing. The newest pairing can include a checkmark showing that the device was added. After displaying the completion window, the method 1700 can proceed to block 1730.

At block 1728, a short menu can be displayed. For example, in response to a paired device being selected from a list of paired devices, e.g., from the list shown in FIG. 14, a short menu 1504 of graphical short context menu can be displayed with a disable option 1506, an edit option 1508, and a more option 1510. In the event the disable option 1506 is selected, the microprocessor 238 can cause the associated paired device to be inactive and the method 1700 can proceed to block 1730. In the event the edit option 1508 is selected, the microprocessor 238 can allow the user to rename the associated paired device and the method 1700 can proceed to block 1730. In the event the more option 1510 is selected, the microprocessor 238 can cause a menu listing additional menu options associated with the paring to be displayed.

At block 1730, the Toolkit application homepage can be displayed. For example, in response to the completion window 1402 being displayed, the microprocessor 238 can display the Toolkit application homepage as shown in FIG. 16. As shown, if there is one or more short range wireless devices paired with the communication device 100, the Toolkit application homepage would display a checkmark in the Bluetooth® icon 1602. The method 1700 ends at block 1730.

Exemplary implementations have been described hereinabove regarding the implementation of pairing short range wireless devices with a communication device. Various modifications to and departures from the disclosed implementations will occur to those having skill in the art. The subject matter that is intended to be within the spirit of this disclosure is set forth in the following claims.

The invention claimed is:

1. A communications device, comprising:
a display;
a short range communication system;
a processor communicatively coupled to the display and the short range communication system; and
a non-transitory memory having stored therein instructions which, when executed by the processor, cause the communications device to:
render a plurality of icons on the display, at least one icon being configured to launch a short range wireless set-up application associated with the short range communication system; and
render a status indicator associated with the icon to convey a status of the short range wireless set-up application, the status indicating whether the communications device is paired to an external short range wireless device.

2. The communications device of claim 1, wherein the plurality of icons are configured to launch at least one of an instant messaging set-up application, a social networking set-up application, an email set-up application, and a wireless data exchange set-up application.

3. The communications device of claim 2, wherein the status indicator is associated with corresponding icons to covey the status of at least one of the instant messaging set-up application, the social networking set-up application, the email set-up application, and the wireless data exchange set-up application.

4. The communications device of claim 1, wherein the status indicator includes a checkmark, an icon color change, or an icon background color change.

5. The communications device of claim 1, wherein the status indicator is overlaid on a short range wireless set-up application icon in response to the communications device being paired with the external short range wireless device.

6. The communications device of claim 1, further comprising instructions which, when executed by the processor, cause the communications device to render a menu for the short range wireless application, the menu being a dropdown menu.

7. The communications device of claim 1, further comprising instructions which, when executed by the processor, cause the communications device to render on the display a list of the at least one short range wireless device paired to the communications device.

8. A method performed on a communications device having a display and a short range communication system, the method comprising:
rendering, via a processor, a plurality of icons on the display, at least one icon being configured to launch a short range wireless set-up application associated with the short range communication system; and
rendering a status indicator associated with the icon to convey a status of the short range wireless set-up application, the status indicating whether the communications device is paired to an external short range wireless device.

9. The method of claim 8, wherein the plurality of icons are configured to launch at least one of an instant messaging set-up application, a social networking set-up application, an email set-up application, and a wireless data exchange set-up application.

10. The method of claim 9, wherein the status indicator is associated with corresponding icons to covey the status of at least one of the instant messaging set-up application, the social networking set-up status application, the email set-up application, and the wireless data exchange set-up application.

11. The method of claim 8, wherein the status indicator includes a checkmark, an icon color change, or an icon background color change.

12. The method of claim 8, wherein the status indicator is overlaid on a short range wireless set-up application icon in response to the communications device being paired with at least one short range wireless device.

13. The method of claim 8, further comprising rendering a menu for the short range wireless application, the menu being dropdown menu.

14. The method of claim 8, further comprising rendering on the display a list of the at least one short range wireless device paired to the communications device.

15. A non-transitory computer-readable medium having stored therein instructions which, when executed by a processor, cause a communications device to perform steps comprising:
rendering a plurality of icons on a display, at least one icon being configured to launch a short range wireless set-up application associated with a short range communication system on the communications device; and
rendering a status indicator associated with the icon to convey a status of the short range wireless set-up application, the status indicating whether the communications device is paired to an external short range wireless device.

16. The non-transitory computer-readable medium of claim 15, wherein the plurality of icons are configured to launch at least one of an instant messaging set-up application, a social networking set-up application, an email set-up application, and a wireless data exchange set-up application.

17. The non-transitory computer-readable medium of claim 16, wherein the status indicator is associated with corresponding icons to covey the status of at least one of the instant messaging set-up application, a social networking set-up, an email account set-up application, and a wireless data exchange set-up application.

18. The non-transitory computer-readable medium of claim 15, wherein the status indicator includes a checkmark, an icon color change, or an icon background color change.

19. The non-transitory computer-readable medium of claim 15, further having stored therein instructions which, when executed by the processor, cause the communications device to overlay the status indicator on a short range wireless set-up application icon in response to the communications device being paired with at least one short range wireless device.

20. The non-transitory computer-readable medium of claim 15, further having stored therein instructions which, when executed by the processor, cause the communications device to render a menu for the short range wireless application, the menu being a dropdown menu.

\* \* \* \* \*